US007746415B2

(12) United States Patent
Tsuchiya et al.

(10) Patent No.: US 7,746,415 B2
(45) Date of Patent: Jun. 29, 2010

(54) OCB LIQUID CRYSTAL DEVICE WITH A PROTRUSION HAVING A CONCAVE PORTION AT ITS TIP, METHOD OF MANUFACTURING LIQUID CRYSTAL DEVICE, ELECTRONIC APPARATUS, AND PROJECTOR

(75) Inventors: Yutaka Tsuchiya, Hara-mura (JP); Kosuke Fukui, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 291 days.

(21) Appl. No.: 11/857,932

(22) Filed: Sep. 19, 2007

(65) Prior Publication Data

US 2008/0074596 A1    Mar. 27, 2008

(30) Foreign Application Priority Data

Sep. 25, 2006    (JP)    ............................ 2006-259472

(51) Int. Cl.
- *G02F 1/133* (2006.01)
- *G02F 1/1333* (2006.01)
- *C09K 19/02* (2006.01)

(52) U.S. Cl. .................... 349/33; 349/138; 349/168

(58) Field of Classification Search ................ 349/33, 349/129, 130
See application file for complete search history.

(56) References Cited

U.S. PATENT DOCUMENTS 6,327,016 B1 * 12/2001 Yamada et al. .............. 349/160

| 2001/0026330 A1 * | 10/2001 | Oh ............................... 349/12 |
| 2004/0207788 A1 * | 10/2004 | Yamaguchi et al. ......... 349/130 |
| 2005/0078254 A1 * | 4/2005 | Lim et al. .................... 349/139 |
| 2006/0125993 A1 * | 6/2006 | Hoshino et al. ............. 349/149 |

FOREIGN PATENT DOCUMENTS

| JP | A 11-007018 | 1/1999 |
| JP | 2002357829 A * | 12/2002 |
| JP | A-2002-357829 | 12/2002 |
| JP | A-2006-113259 | 4/2006 |
| JP | A-2007-58019 | 3/2007 |

\* cited by examiner

*Primary Examiner*—Andrew Schechter
*Assistant Examiner*—Paul C Lee
(74) *Attorney, Agent, or Firm*—Oliff & Berridge, PLC

(57) ABSTRACT

Disclosed herein is a liquid crystal device which includes first and second substrates which face each other and a liquid crystal layer interposed between the first substrate and the second substrate, and transitions an alignment state of liquid crystal molecules of the liquid crystal layer from a spray alignment to a bend alignment to perform display or optical modulation, the liquid crystal device including: a protrusion which is provided on at least one of the first substrate and the second substrate at the side of the liquid crystal layer and has a concave portion; and an alignment film which is provided on the surfaces of the first substrate and the second substrate at the side of the liquid crystal layer so as to cover the surface of the protrusion including the concave portion.

8 Claims, 9 Drawing Sheets

(SPRAY ALIGNMENT)

(BEND ALIGNMENT)

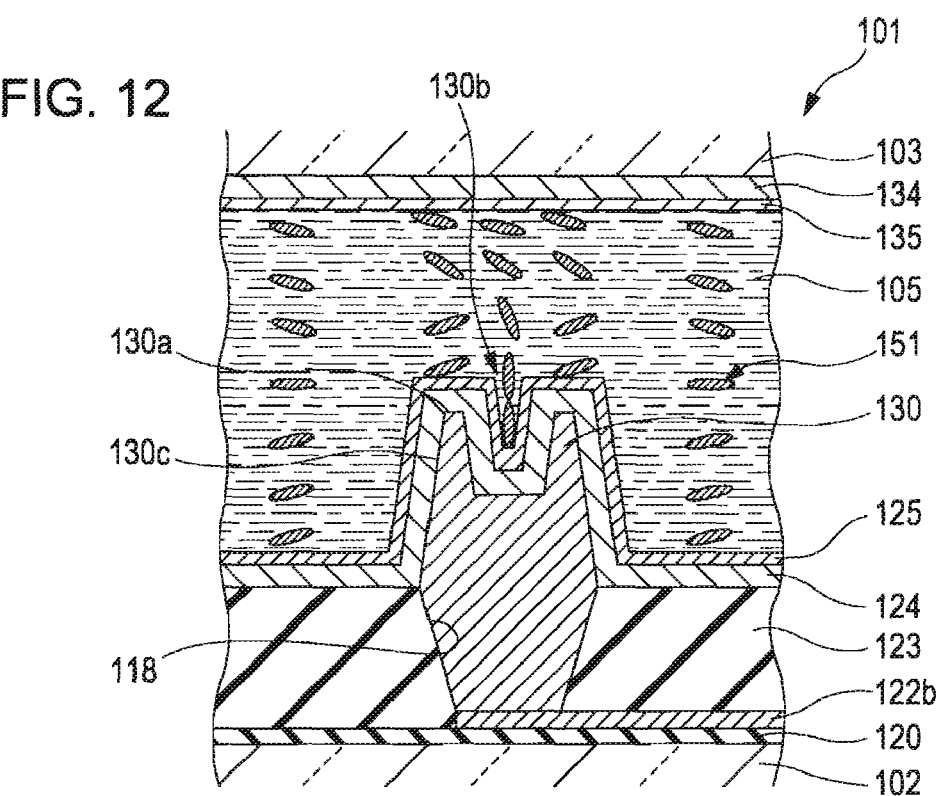
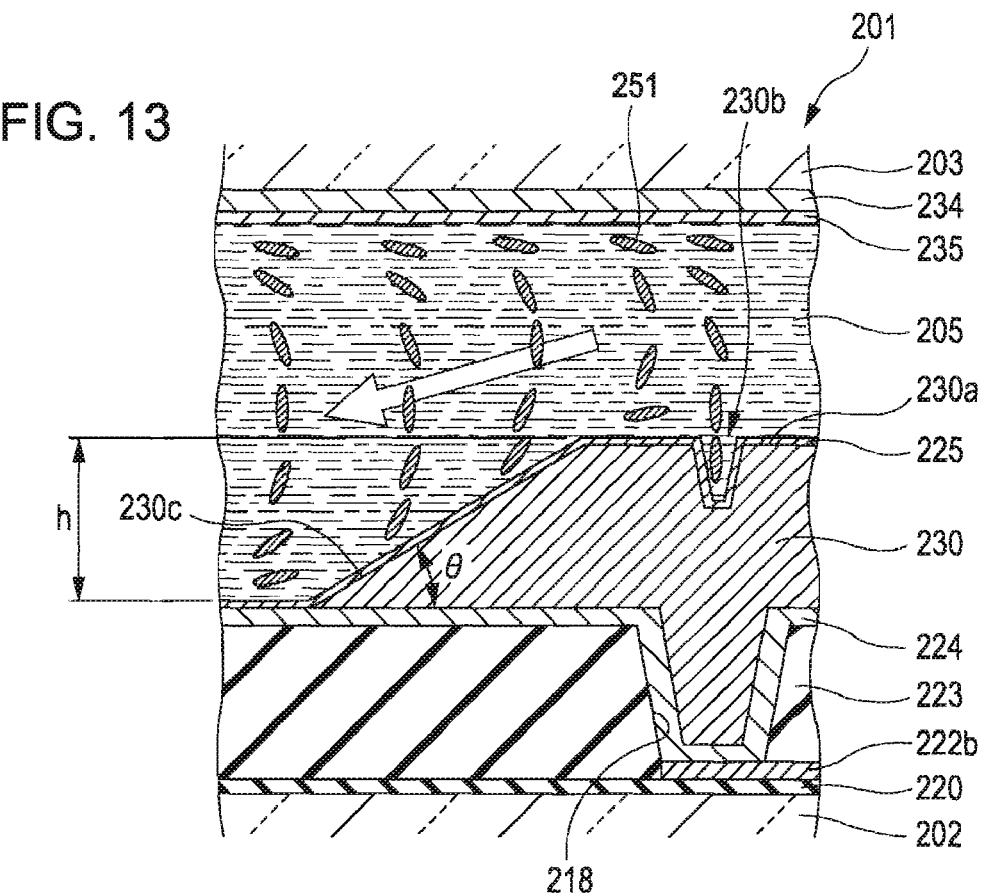

OCB LIQUID CRYSTAL DEVICE WITH A PROTRUSION HAVING A CONCAVE PORTION AT ITS TIP, METHOD OF MANUFACTURING LIQUID CRYSTAL DEVICE, ELECTRONIC APPARATUS, AND PROJECTOR

BACKGROUND

1. Technical Field

The present invention relates to a liquid crystal device, a method of manufacturing a liquid crystal device, an electronic apparatus and a projector.

2. Related Art

In a liquid crystal device such as a liquid crystal television set or a liquid crystal projector, improvement of image quality of a still image or a moving image is required. In order to improve the image quality of the moving image, a response speed of the liquid crystal device should be increased. Recently, an optical compensated bend (OCB) mode liquid crystal device having a high response speed has been attracting much attention.

In the OCB mode liquid crystal device, alignment of liquid crystal molecules varies between an initial state and a display operation state. In the initial state, the alignment of the liquid crystal molecules is adjusted such that the molecules are aligned in a spray shape between two substrates (spray alignment). In the display operation state, the alignment of the liquid crystal molecules is adjusted such that the molecules are aligned in a bend shape between the two substrates (bend alignment).

When image display or optical modulation is performed in the OCB mode liquid crystal device, a drive voltage is applied in a bend alignment state. In the bend alignment state, since a time period from a time point when the voltage is applied to a time point when the alignment of liquid crystal molecules is switched is shorter than that of a TN mode or STN mode liquid crystal device, light transmissivity of a liquid crystal layer can be changed in a short time and thus a high-speed response is possible.

In the OCB mode liquid crystal device, when the alignment of the liquid crystal molecules is changed from the spray alignment to the bend alignment, a voltage larger than or equal to a threshold voltage needs to be applied to the liquid crystal layer (initial transition operation). If the initial transition operation is insufficient, the change from the spray alignment to the bend alignment is insufficient. Thus, a display failure occurs or the response speed is decreased. Accordingly, a configuration for generating a bend transition nucleus in order to facilitate the initial transition has been disclosed (see, for example, JP-A-11-7018).

The configuration for generating the bend transition nucleus in order to facilitate the initial transition is efficient. More particularly, a configuration for generating a bend transition nucleus to easily bend-align liquid crystal molecules is required.

SUMMARY

An advantage of some aspects of the invention is that it provides a liquid crystal device, a method of manufacturing the liquid crystal device, an electronic apparatus and a projector, which are capable of easily bend-aligning liquid crystal molecules.

According to an aspect of the invention, there is provided a liquid crystal device which includes first, and second substrates which face each other and a liquid crystal layer interposed between the first substrate and the second substrate, and changes an alignment state of liquid crystal molecules of the liquid crystal layer from a spray alignment to a bend alignment to perform display or optical modulation, the liquid crystal device including: a protrusion which is provided on at least one of the first substrate and the second substrate at the side of the liquid crystal layer and has a concave portion; and an alignment film which is provided on the surfaces of the first substrate and the second substrate at the side of the liquid crystal layer so as to cover the surface of the protrusion including the concave portion.

According to the invention, since the protrusion having the concave portion is provided on at least one of the first substrate and the second substrate, a portion of the liquid crystal molecules is thrust into the concave portion of the protrusion such the liquid crystal molecules are oriented in the vicinity of the opening of the concave portion in a direction perpendicular to the surface of the substrate. That is, the liquid crystal molecules are arranged along the direction perpendicular to the surface of the substrate. When a voltage is applied to the liquid crystal layer in this state to perform an initial transition operation, the liquid crystal molecules in the vicinity of the opening of the concave portion function as nuclei and the bend alignment propagates into the vicinity of the liquid crystal molecules. Accordingly, it is possible to easily bend-align all the liquid crystal molecules, compared with a case where the voltage for the initial transition operation is applied in a state in which the protrusion is not provided.

The liquid crystal device may further include a pixel electrode provided on the first substrate; and a switching element which is provided on the first substrate and is electrically connected to the pixel electrode through a contact hole, the contact hole may be provided, in a region which overlaps the pixel electrode in plan view, and the protrusion may be provided at a position which overlaps the contact hole in plan view.

According to the invention, since the protrusion is provided at the position which overlaps the contact hole in plan view, the shape of the contact hole can be used when the concave portion of the protrusion is formed. For example, when the film is formed on the contact hole by the sputtering method, the concave portion having the shape along the shape of the contact hole is formed on the upper surface of the film formed on the contact hole. Accordingly, it is advantageous that the protrusion and the concave portion can be formed by one process.

In the liquid crystal device, a common electrode may be provided on the second substrate at the side of the liquid crystal layer, and the protrusion may be formed of a conductive material.

According to the invention, a region, in which the protrusion formed of the conductive material is provided, becomes close to the common electrode provided on the second substrate at the side of the liquid crystal layer. Accordingly, in the region in which the protrusion is provided, an electric field applied at the time of the initial transition becomes strong and thus the liquid crystal molecules in the region, in which the protrusion is provided, are applied with an electric field stronger than that of the other region. Accordingly, the liquid crystal molecules are easily bend-aligned. In addition, the bend alignment easily propagates from the liquid crystal molecules of the region, in which the protrusion is provided, into the vicinity thereof. Accordingly, all the liquid crystal molecules are more easily bend-aligned.

In the liquid crystal device, the protrusion may be provided on the pixel electrode.

According to the invention, since the protrusion is provided on the pixel electrode, the known configuration can be used in the electrical connection between the switching element and the pixel electrode.

In the liquid crystal device, the pixel electrode may be provided on the protrusion.

According to the invention, since the pixel electrode is provided on the protrusion, it is possible to electrically connect the pixel electrode and the switching element through the protrusion. For example, since a high conductive material such as metal is used as a material configuring the protrusion, the pixel electrode and the switching element can be electrically connected with low resistance.

In the liquid crystal device, the concave portion may have a predetermined diameter and a predetermined depth, and the predetermined diameter r and the predetermined depth d may satisfy $1 < (d/r) \leq 5$.

According to the invention, since the concave portion has the predetermined diameter and the predetermined depth, and the predetermined diameter r and the predetermined depth d satisfy $1 < (d/r) \leq 5$, it is possible to adjust the liquid crystal molecules in the concave portion in the direction perpendicular to the surface of the substrate with certainty. The reason why $(d/r) > 1$ is because, if the value is equal to or less than 1, the orientation of the liquid crystal molecules cannot be sufficiently adjusted in the direction perpendicular to the substrate. The reason why $(d/r) \leq 5$ is because, if the value is greater than 5, it is difficult to manufacture the concave portion due to straightness of sputter particles.

In the liquid crystal device, the protrusion may have a tapered portion at the circumference of the concave portion.

According to the invention, since the protrusion has the tapered portion at the circumference of the concave portion, it is possible to generate a bend transition nucleus in the concave portion and to easily diffuse bend transition toward the circumference of the concave portion along the tapered portion, at the time of the initial transition operation. Accordingly, it is possible to easily diffuse the bend transition.

According to another aspect of the invention, there is provided a method, of manufacturing a liquid crystal device which includes a pair of substrates which face each other and a liquid crystal layer interposed between the pair of substrates, and changes an alignment state of liquid crystal molecules of the liquid crystal layer from a spray alignment to a bend alignment to perform display or optical modulation, the method including: forming a switching element on one of the pair of substrates; forming an insulating layer on the pair of substrates so as to cover the switching element; forming a contact hole electrically connected to the switching element in a portion of the insulating layer; forming an electrode on the insulating layer so as to cover the inside of the contact hole; forming a mask layer on the electrode so as to surround the contact hole; forming a material film on the one substrate, on which the mask layer is formed, by a sputtering method; removing the mask layer and a portion, which is formed on the mask layer, of the material film formed on the one substrate by a lift-off method and forming a protrusion having a concave portion; and forming an alignment film on the surface of the one substrate so as to cover the surface of the protrusion including the concave portion formed on the one surface.

According to the invention, since the mask layer is formed on the electrode so as to surround the contact hole, the material film is formed on the one substrate, on which the mask layer is formed, by a sputtering method, the mask layer and a portion, which is formed on the mask layer, of the material film formed on the one substrate are removed by the lift-off method, and the protrusion having the concave portion is formed, the concave portion of the protrusion is formed in a shape along the shape of the contact hole. Accordingly, since the protrusion and the concave portion can be manufactured by one process, it is possible to simplify a manufacturing process.

According to another aspect of the invention, there is provided a method of manufacturing a liquid crystal device which includes a pair of substrates which face each other and a liquid crystal layer interposed between the pair of substrates, and changes an alignment state of liquid crystal molecules of the liquid crystal layer from a spray alignment to a bend alignment to perform display or optical modulation, the method including: forming a switching element on one of the pair of substrates; forming an insulating layer on the pair of substrates so as to cover the switching element; forming a contact hole electrically connected to the switching element in a portion of the insulating layer; forming a mask layer on the insulating layer so as to surround the contact hole; forming a conductive material film on the one substrate, on which the mask layer is formed, by a sputtering method; removing the mask layer and a portion, which is formed on the mask layer, of the conductive material film formed on the one substrate by a lift-off method and forming a protrusion having a concave portion; forming an electrode on the insulating layer so as to cover the surface of the protrusion including the concave portion; and forming an alignment film on the surface of the one substrate along the surface of the electrode.

According to the invention, since the mask layer is formed on the insulating layer so as to surround the contact hole, the conductive material film is formed on the one substrate, on which the mask layer is formed, by the sputtering, the mask layer and the portion, which is formed on the mask layer, of the conductive material film formed on the one substrate are removed by the lift-off method, the protrusion having the concave portion is formed, and the electrode is formed on the insulating layer so as to cover the surface of the protrusion including the concave portion, it is possible to facilitate electrical connection between the switching element and the electrode.

An electronic apparatus according to the invention includes the above-described liquid crystal device mounted therein.

According to the invention, since the liquid crystal device which can easily bend-align all the liquid crystal molecules when a voltage for an initial transition operation is applied is mounted, it is possible to obtain an electronic apparatus having the display unit for displaying an image with a high display characteristic and a high response speed.

A projector according to the invention includes the above-described liquid crystal device mounted therein.

According to the invention, since the liquid crystal device which can easily bend-align all the liquid crystal molecules when a voltage for an initial transition operation is applied is mounted, it is possible to obtain a projector for displaying an image with a high display characteristic and a high response speed.

BRIEF DESCRIPTION OF THE DRAWINGS

The invention will be described with reference to the accompanying drawings, wherein like numbers reference like elements.

FIG. 12 is a cross-sectional view showing the configuration of a liquid crystal device according to a second embodiment of the invention.

FIG. 13 is a cross-sectional view showing the configuration of a liquid crystal device according to a third embodiment of the invention.

DESCRIPTION OF EXEMPLARY EMBODIMENTS

Hereinafter, embodiments of the invention will be described with reference to the accompanying drawings. In each view used for following description, the scale of each layer or each element is differentiated from others in order that each layer or each element has a size capable of being identified in the view.

First Embodiment

Figure 1:
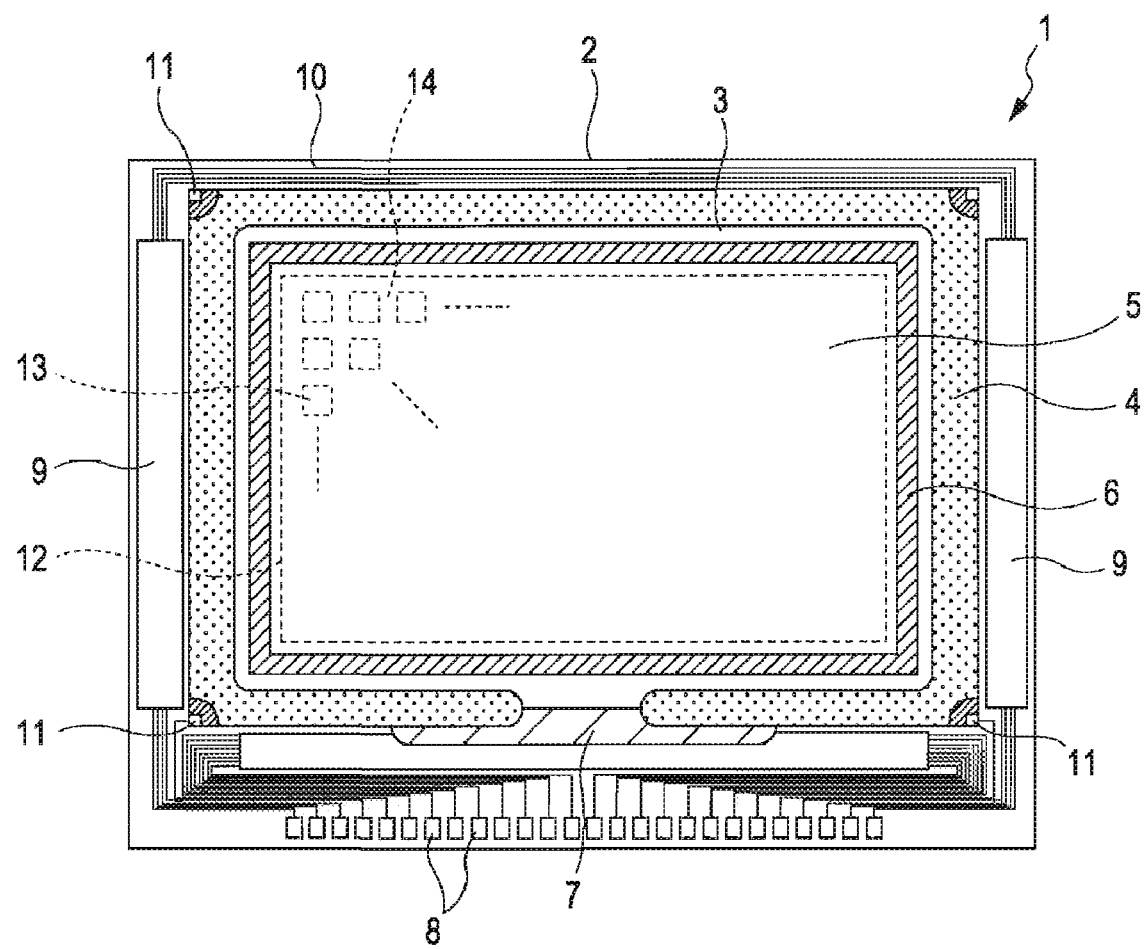
FIG. 1 is a plan view showing the configuration of a liquid crystal device according to a first embodiment of the invention.

A first embodiment of the invention will be described. FIG. 1 is a plan view showing a liquid crystal device according to the present embodiment. In the present embodiment, for example, a TFT active matrix type OCB mode liquid crystal device, using a thin-film transistor (TFT) as a pixel switching element will be described.

As shown in FIG. 1, the liquid crystal device 1 includes a TFT array substrate 2, a counter substrate 3, and a liquid crystal layer 5 interposed between the TFT array substrate 2 and the counter substrate 3. The liquid crystal device 1 is configured by adhering the TFT array substrate 2 and the counter substrate 3 to each other using a seal material 4 provided therebetween and filling the liquid crystal layer 5 in a region surrounded by the seal material 4. The TFT array substrate 2 and the counter substrate 3 are, for example, transparent substrates formed of a transparent material such as glass.

A peripheral partition 6 formed of a light-shielding material is formed inside the seal material 4. A region surrounded by the peripheral partition 6 is an optical modulation region 12 for modulating external light. In the optical modulation region 12, sub pixels 13 which can transmit light are arranged in a matrix. A region between the sub pixels 13 is an inter-pixel region 14 acting as a light-shielding.

A data line drive circuit 7 and an external circuit mounting terminal 8 are formed outside the seal material 4 along one side of the TFT array substrate 2 and scanning line drive circuits 9 are formed along two sides adjacent to the one side. A plurality of wire lines 10 for connecting the scanning line drive circuits 9 provided at both sides of an image display region are provided at a remaining side of the TFT array substrate 2. Inter-substrate conduction materials 11 for electrically connecting the TFT array substrate 2 and the counter substrate 3 are provided at corners of the counter substrate 3.

Figure 2:
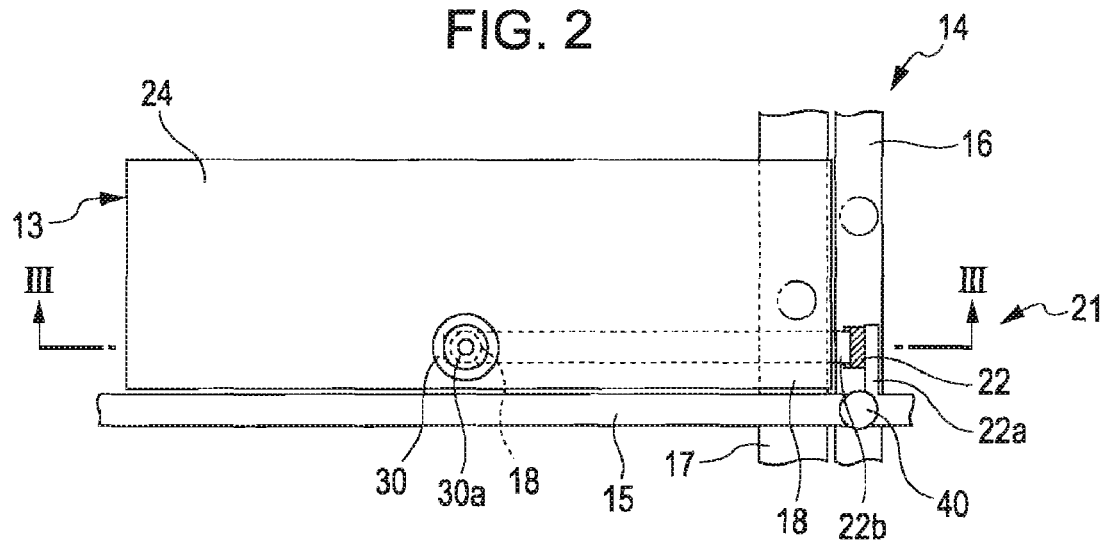
FIG. 2 is a plan view showing the configuration of a portion of the liquid crystal device according to the present embodiment.

FIG. 2 is a plan view showing a sub pixel which is an image display unit of the liquid crystal device 1, and shows the configuration of the TFT array substrate 2.

As shown in FIG. 2, a pixel electrode 24 having a rectangular shape is provided on the TFT array substrate 2 in a region which overlaps the sub pixel 13 in plan view. The pixel electrode 24 is formed of, for example, a transparent conductive material such as indium tin oxide (ITO). A data line 15, a scanning line 16 and a TFT 21 are formed in the inter-pixel region 14. The data line 15 extends in a longitudinal direction of the TFT array substrate 2. The scanning line 16 extends in a widthwise direction of the TFT array substrate 2. A capacitive line 17 is provided adjacent to the scanning line 16 and extends along the scanning line 16 such that a portion overlaps the sub pixel 13. A cylindrical spacer 40 is provided at an intersection between the data line 15 and the scanning line 16.

A bottom gate type TFT 21 is formed in the vicinity of the intersection between the data line 15 and the scanning line 16. The TFT 21 has a semiconductor thin film 22, a source electrode 22a and a drain electrode 22b. The semiconductor thin film 22 is formed of, for example, silicon and has a source region and a drain region. One end of the source electrode 22a is connected to the source region of the semiconductor thin film 22 and the other end thereof is connected to the data line 15. One end of the drain electrode 22b is connected to the drain region of the semiconductor thin film 22 and the other end thereof extends to substantially a central portion of the pixel electrode 24 along the data line 15. The other end of the drain electrode 22b is electrically connected to the pixel electrode 24 through a contact hole 18. A protrusion 30 protruding from the surface of the liquid crystal layer is provided at a portion which overlaps the contact hole 18 in plan view.

Figure 3:
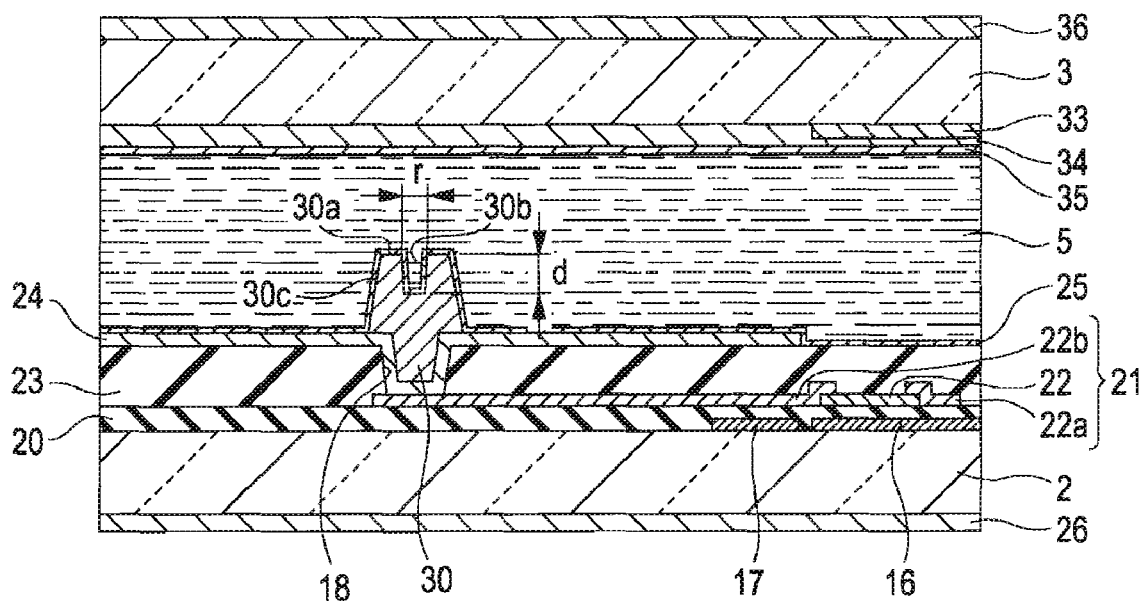
FIG. 3 is a cross-sectional view showing the configuration of the liquid crystal device according to the present embodiment.

The detailed configuration of the protrusion 30 and the cross section of the sub pixel 13 will be described. FIG. 3 is a view showing the configuration taken along line III-III passing through the central portion of the protrusion 30 in FIG. 2.

As shown in FIG. 3, the scanning line 16 and the capacitive line 17 are formed on the inner surface (the surface opposed, to the counter substrate 3) of the TFT array substrate 2 and an insulating layer 20 is formed so as to cover the scanning line 16 and the capacitive line 17. On the insulating layer 20, the semiconductor thin film 22, the source electrode 22a and the drain region 22b are formed. A portion of the source electrode 22a is formed on the source region of the semiconductor thin film 22. A portion of the drain electrode 22b is formed on the drain region of the semiconductor thin film 22. On the insulating layer 20, an interlayer insulating film 23 is formed so as to cover the surface of the insulating layer 20, the semiconductor thin film 22, the source electrode 22a and the drain electrode 22b.

On the interlayer insulating film 23, the pixel electrode 24 is formed. The contact hole 18 which passes through the interlayer insulating film 23 to reach the drain electrode 22b is formed in a portion of the interlayer insulating film 23. A portion of the pixel electrode 24 is formed along the inner surface of the contact hole 18 and the inner surface of the contact hole 18 is covered by the pixel electrode 24. The pixel electrode 24 formed in the contact hole 18 is connected to the drain electrode 22b at the bottom of the contact hole 18.

The protrusion is provided on the contact hole 18 of the pixel electrode 24. The protrusion 30 protrudes toward the liquid crystal layer 5 and is formed of, for example, a transparent conductive member such as ITO or metal such as aluminum or copper. In the present embodiment, the protrusion 30 is formed of aluminum. In the upper surface 30a of the protrusion 30, a concave portion 30b formed toward the TFT array substrate 2 is provided. The diameter (predetermined diameter) of the concave portion 30b is preferably in a range of about 0.5 μm to 1.0 μm. A ratio of the depth (predetermined depth: depth from the upper surface 30a) of the concave portion 30b to the diameter of the concave portion 30b, that is, an aspect ratio of the concave portion 30b, is preferably $1<(d/r)\leqq 5$.

An alignment film 25 is provided on the protrusion 30. The alignment film 25 covers portions of the pixel electrode 24 and the interlayer insulating film 23 and covers the upper surface 30a of the protrusion 30, and the surface and the side surface of the concave portion 30b.

Figure 4A:
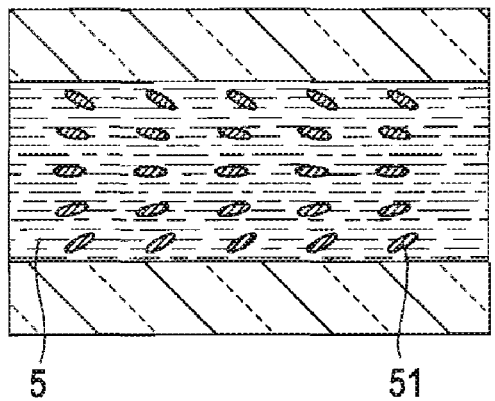
FIG. 4 is a cross-sectional view showing alignment of liquid crystal molecules of an OCB mode liquid crystal device.
Figure 4B:
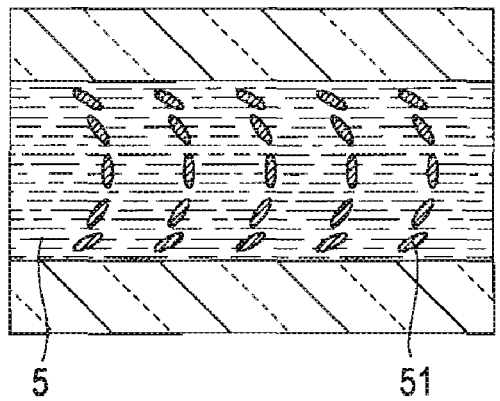

FIG. 4 is a view explaining an alignment state of liquid crystal molecules in the OCB mode liquid crystal device. In the OCB mode liquid crystal device, in an initial state (non-operation state), as shown in FIG. 4A, liquid crystal molecules 51 are aligned in a spray shape (spray alignment). In a display operation state, as shown in FIG. 4B, the crystal molecules 51 are aligned in a bend shape (bend alignment).

Next, a method of manufacturing the liquid crystal device 1 having the above-described configuration will be described, concentrating on a process of forming the protrusion 30.

Figure 5:
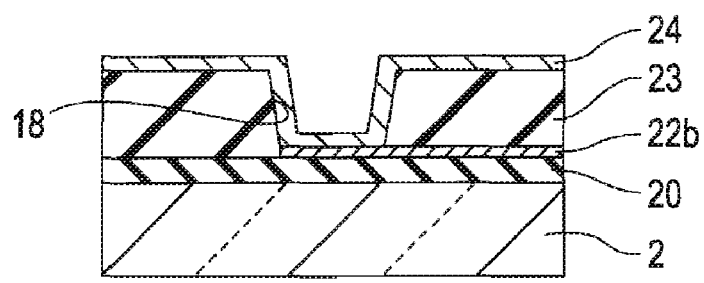
FIG. 5 is a view showing a process of manufacturing the liquid crystal device according to the present embodiment.

First, on the TFT array substrate 2, the wire line, an insulating film 20, the semiconductor thin film 22, the source electrode, and the drain electrode 22b are formed and the interlayer insulating film 23 is formed. When the interlayer insulating film 23 is formed, the contact hole 18 passing through the interlayer insulating film 23 is formed at a position which overlaps the end of the drain electrode 22b in plan view. When the contact hole 18 is formed, the pixel electrode 24 is formed so as to cover the interlayer insulating film 23 and the contact hole 18 to become a state shown in FIG. 5.

Figure 6:
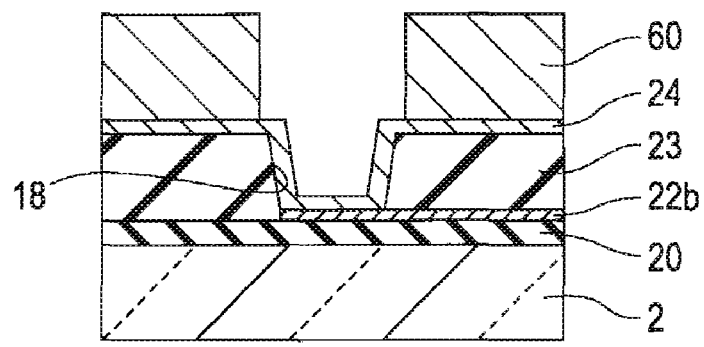
FIG. 6 is a view showing a process of manufacturing the liquid crystal device according to the present embodiment.
Figure 7:
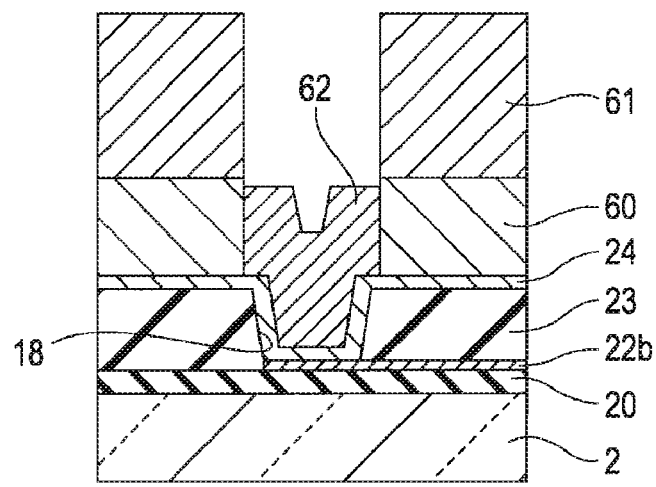
FIG. 7 is a view showing a process of manufacturing the liquid crystal device according to the present embodiment.

Next, as shown in FIG. 6, a resist 60 is patterned on the pixel electrode 24 so as to surround a region in which the contact hole 18 is formed. When the resist 60 is formed, as shown in FIG. 7, aluminum is sputtered on the resist 60. By sputtering, a thin film 61 formed of aluminum is formed on the resist 60 and an aluminum layer 62 is formed in the contact hole 18 and the peripheral portion thereof, which are not covered by the resist 60.

Figure 8:
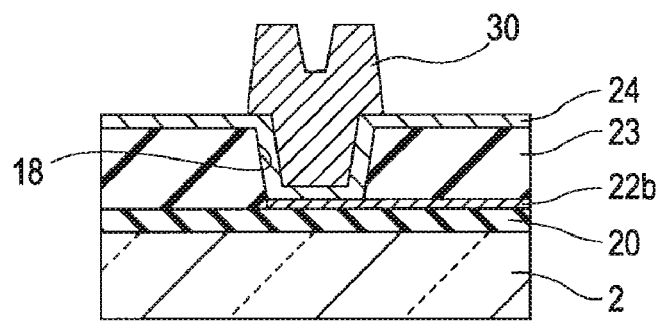
FIG. 8 is a view showing a process of manufacturing the liquid crystal device according to the present embodiment.
Figure 9:
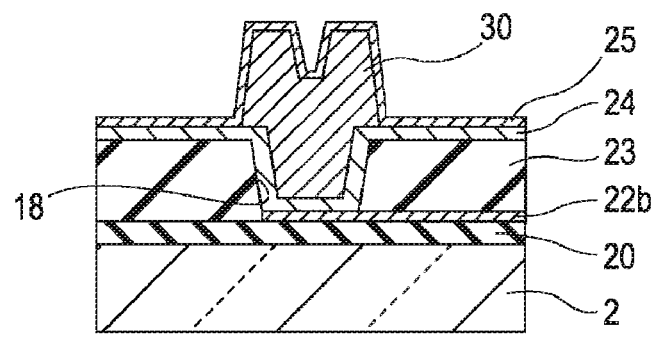
FIG. 9 is a view showing a process of manufacturing the liquid crystal device according to the present embodiment.

When aluminum is sputtered, as shown in FIG. 8, the resist 60 and the aluminum thin film 62 on the resist 60 are removed by, for example, a lift-off method. By the removal, the protrusion 30 is formed. When the protrusion 30 is formed, as shown in FIG. 9, the alignment film 25 is formed so as to cover the pixel electrode 24 and the protrusion 30. Accordingly, the TFT array substrate 2 is formed.

Figure 10:
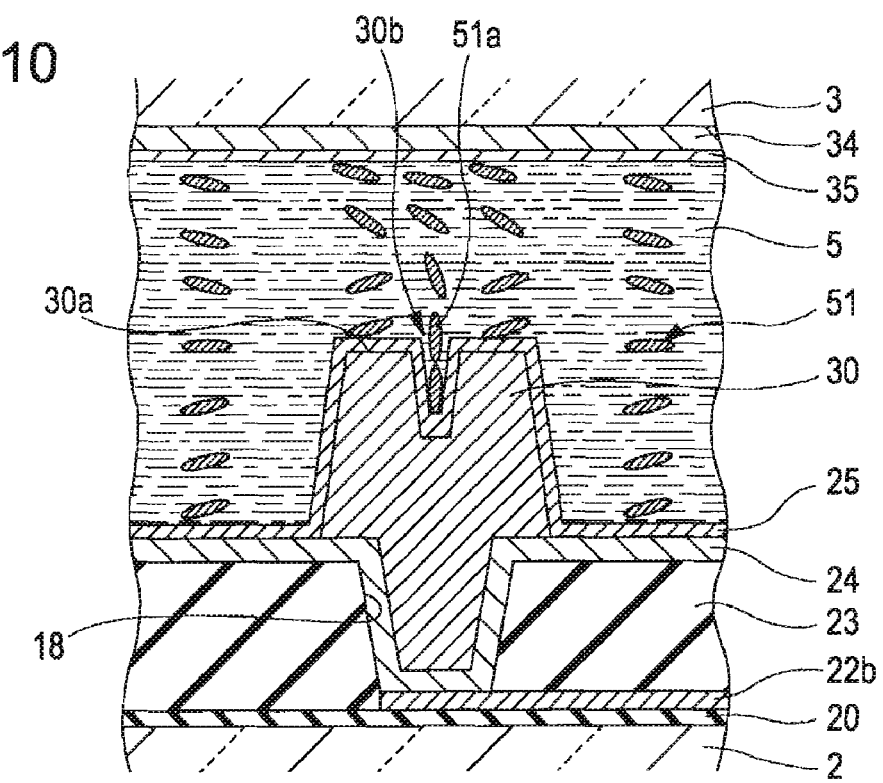
FIG. 10 is a cross-sectional view showing an operation of the liquid crystal device according to the present embodiment.

FIG. 10 is a view showing a state in which the liquid crystal molecules of the liquid crystal device 1 are spray-aligned.

According to the present embodiment, as shown in FIG. 10, a portion of the liquid crystal molecules 51 is thrust into the concave portion 30b provided in the upper surface 30a of the protrusion 30, and the liquid crystal molecules 51a are oriented in the vicinity of the opening of the concave portion 30b in a direction perpendicular to the surface of the substrate.

Figure 11:
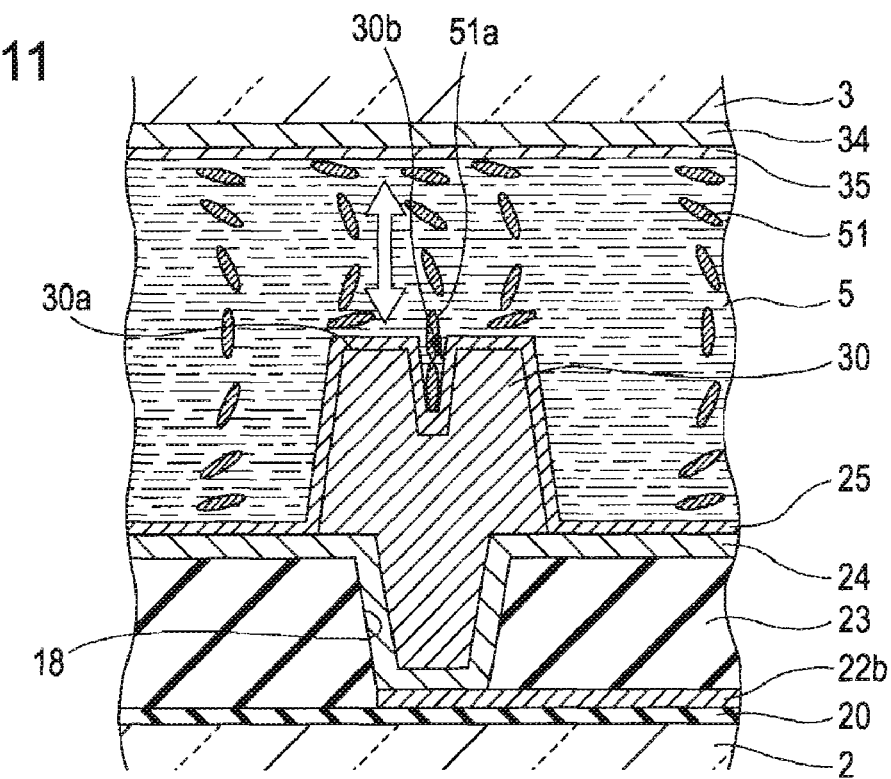
FIG. 11 is a cross-sectional view showing an operation of the liquid crystal device according to the present embodiment.

When a voltage for an initial transition operation is applied to the liquid crystal layer 5 in this state, as shown in FIG. 11, the liquid crystal molecules 51 in the vicinity of the opening of the concave portion 30b function as nuclei and the bend alignment propagates into the vicinity of the liquid crystal molecules 51a. Accordingly, it is possible to easily bend-align all the liquid crystal molecules 51, compared with a case where the voltage for the initial transition operation is applied in a state in which the protrusion 30 is not provided.

A region, in which the protrusion 30 formed of the conductive material is provided, becomes close to a common electrode 34. Accordingly, in the region in which the protrusion 30 is provided, an electric field applied at the time of the initial transition becomes strong and thus the liquid crystal molecules in the region, in which the protrusion 30 is provided, are applied with an electric field stronger than that of the other region. Accordingly, the liquid crystal molecules are easily bend-aligned. In addition, the bend alignment easily propagates from the liquid crystal molecules of the region, in which the protrusion 30 is provided, into the vicinity thereof. Accordingly, all the liquid crystal molecules are more easily bend-aligned.

Second Embodiment

Next, a second embodiment of the invention will be described. Similar to the first embodiment, in each view used for following description, the scale of each layer or each element is differentiated from each other in order that each layer or each element has a size capable of being identified in the view. The description of the same components as the first embodiment will be omitted. In the present embodiment, the configuration of the protrusion is different from that of the first embodiment and thus will be described in detail.

FIG. 12 is a cross-sectional view showing the configuration of a liquid crystal device 101 according to the present embodiment, which corresponds to the first embodiment shown in FIG. 10.

As shown in FIG. 12, the liquid crystal device 101 according to the present embodiment is different from the first embodiment in that a protrusion 130 is provided at a lower layer side of a pixel electrode 124. An insulating film 120 is formed on a TFT array substrate 102 and a drain electrode 122b is formed on the insulating film 120. An interlayer insulating film 123 is formed so as to cover portions of the drain electrode 122b and the insulating film 120. A contact hole 118 is formed in the interlayer insulating film 123 at a position which overlaps an end of the drain electrode 122b in plan view. The protrusion 130 is formed such that the contact hole 118 is buried and a portion protrudes from the interlayer insulating film 123. A concave portion 130b is formed in the upper surface 130a of the protrusion 130.

The pixel electrode 124 is provided so as to cover the interlayer insulating film 123, the upper surface 130a and the concave portion 130b of the protrusion 130, and the side surface 130c of the portion protruding from the interlayer insulating film 123. An alignment film 125 is provided on the pixel electrode 124. The alignment film 125 is provided along the shape of the surface of the pixel electrode 124. In a portion in which the concave portion 130b of the protrusion 130 is provided, the alignment film 125 is formed in a shape along the surface of the pixel electrode 124. The other configurations are similar to those of the first embodiment.

According to the present embodiment, since the protrusion 130 is provided at the lower layer side of the pixel electrode 124, the pixel electrode 124 and the drain electrode 122b are electrically connected through the protrusion 130. In the present, embodiment, since metal (aluminum, similar to the first embodiment) is used as a material configuring the protrusion 130, the pixel electrode 124 and the drain electrode 122b can be electrically connected with low resistance.

Third Embodiment

Next, a third embodiment of the invention will be described. Similar to the first embodiment, in each view used for following description, the scale of each layer or each element is differentiated from each other in order that each layer or each element has a size capable of being identified in the view. The description of the same components as the first embodiment will be omitted. In the present embodiment, the configuration of the protrusion is different from that of the first embodiment and thus will be described in detail.

FIG. 13 is a cross-sectional view showing the configuration of a liquid crystal device 201 according to the present embodiment, which corresponds to the first embodiment shown in FIG. 10.

As shown in FIG. 13, the liquid crystal device 201 according to the present embodiment is different from the first embodiment in that a tapered portion 230c is provided in a protrusion 230, and the other configurations are similar to those of the first embodiment. The protrusion 230 is provided on a region in which a contact hole 218 of a pixel electrode 224 is provided. A concave portion 230b is provided in the upper surface 230a of the protrusion 230 and the circumference of the concave portion 230b has the tapered portion 230c. The tapered portion 230c is formed such that a height h from the surface of the pixel electrode 224 is gradually decreased from the circumference of the concave portion 230b to the side of the pixel electrode 224. With respect to an angle θ between the tapered portion 230c and the pixel electrode 224 is in a range of θ1≦θ≦90°, if a pitch of a sub pixel is p. If the width of the upper surface 230a is ignorable, θ1 is θ1=tan$^{-1}$ (2 h/p). In the present embodiment, if h=2μ and p=100 μm, θ1 is 2.3°. The value of θ is preferably in a 40° to 50° and more particularly 45°.

According to the present embodiment, since the protrusion 230 has the tapered portion 230c at the circumference of the concave portion 230b, it is possible to generate a bend transition nucleus in the concave portion 230b with certainty and to easily diffuse bend transition toward the circumference of the concave portion 230b along the tapered portion 230c, at the time of the initial transition operation. Accordingly, it is possible to easily diffuse the bend transition.

Fourth Embodiment

Next, a fourth embodiment of the invention will be described. Similar to the first embodiment, in each view used for following description, the scale of each layer or each element is differentiated from each other in order that each layer or each element has a size capable of being identified in the view. The description of the same components as the first embodiment will be omitted. In the present embodiment, the configuration of the protrusion is different from that of the first embodiment and thus will be described in detail.

Figure 14:
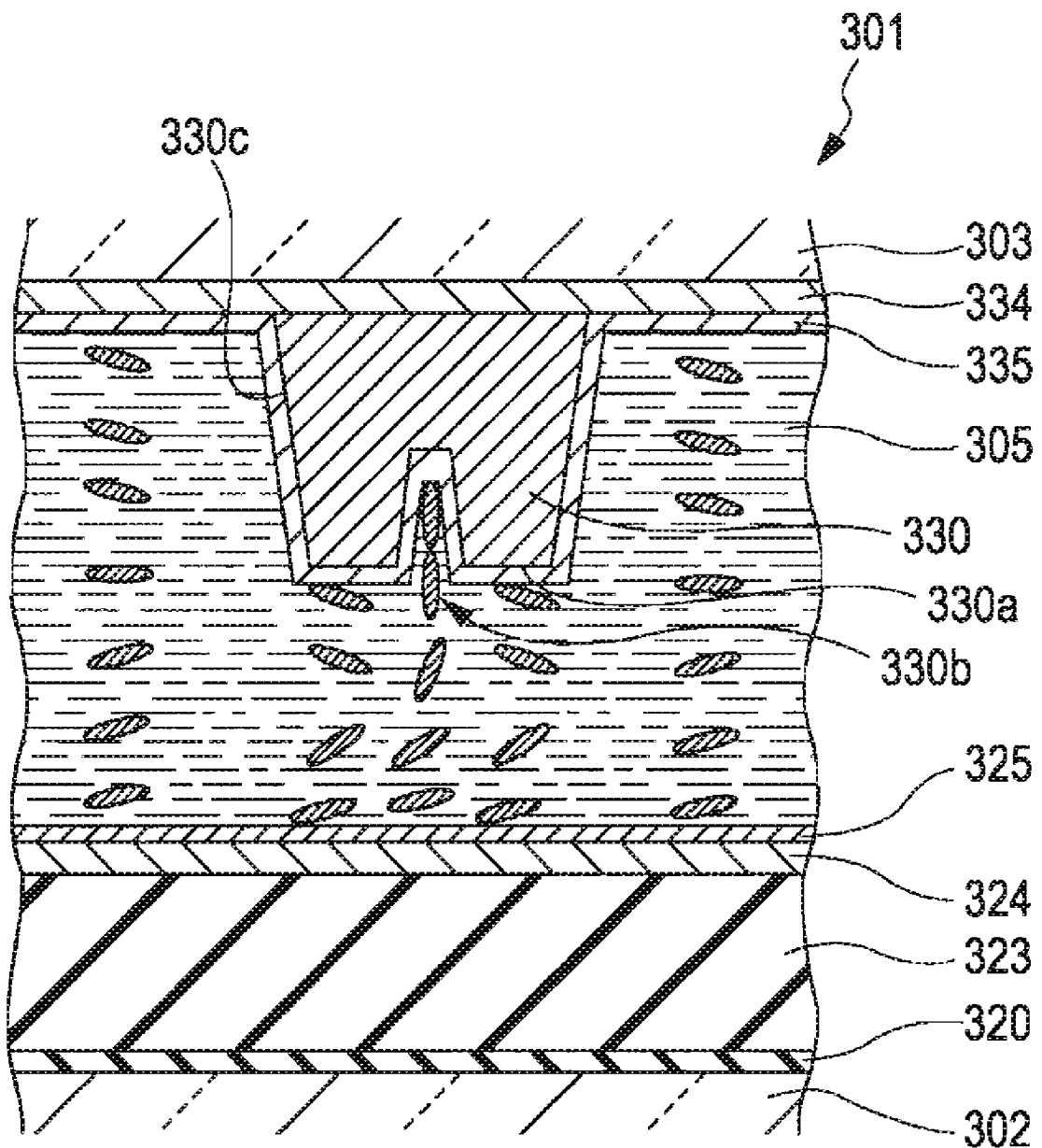
FIG. 14 is a cross-sectional view showing the configuration of a liquid crystal device according to a fourth embodiment of the invention.

FIG. 14 is a cross-sectional view showing the configuration of a liquid crystal device 301 according to the present embodiment, which corresponds to the first embodiment shown in FIG. 10.

As shown in FIG. 14, the liquid crystal device 301 according to the present embodiment is different from the first embodiment in that a protrusion 330 is provided at the side of the counter substrate 303. A common electrode 334 is formed on substantially the entire inner surface (surface opposed to the TFT array substrate 302) of the counter substrate 303. The protrusion 330 is formed on the common electrode 334. Similar to the first embodiment, the protrusion 330 is formed of a conductive material such as a transparent conductive member such as ITO or metal such as aluminum, copper or chrome. A concave portion 330b is formed in the upper surface 330a of the protrusion 330. An alignment film 335 is formed so as to cover a portion of the common electrode 334 and the surface of the protrusion 330. The alignment film 335 is formed so as to cover the upper 330a, the concave portion 330b and the side surface 330c of the protrusion 330. The protrusion 330 may be formed of the same material of a light-shielding film or a plurality of protrusions 330 may be formed on the light-shielding film.

An insulating film 320 is formed on the inner surface (surface opposed to the counter substrate 303) of the TFT array substrate 302. A semiconductor thin film, a source electrode and a drain electrode (all of which are not shown) configuring a TFT are formed on the insulating film 320. An interlayer insulating film 323 is formed on the insulating film 320 so as to cover a portion of the insulating film 320 and the members configuring the TFT, and a pixel electrode 324 is formed on the interlayer insulating film 323. An alignment film 325 is formed on the pixel electrode 324.

According to the present invention, since the protrusion 330 is provided on the counter substrate, the same effect as the above-described embodiments can be obtained.

Fifth Embodiment

Figure 15:
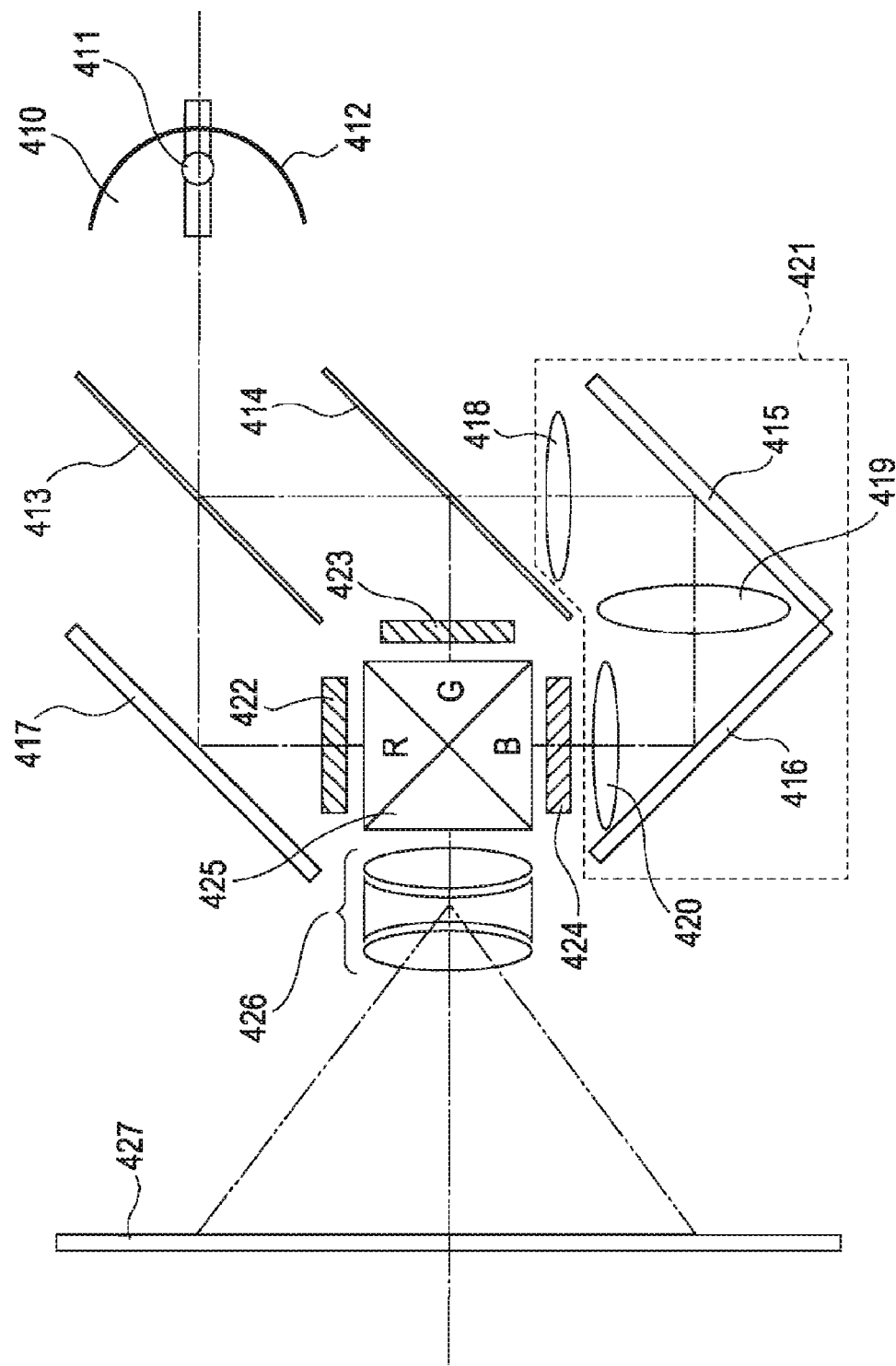
FIG. 15 is a view showing the configuration of a projector according to a fifth embodiment of the invention.

Next, the configuration of a projection display apparatus (projector) including the liquid crystal device of the above-described embodiment as an optical modulation device will be described with reference to FIG. 15. FIG. 15 is a schematic view showing the configurations of main portions of the projection display apparatus using the liquid crystal device of the above-described embodiment as the optical modulation device. In FIG. 15, a reference numeral 410 denotes a light source, 413 and 414 denote dichroic mirrors, 415, 416 and 417 denote reflection mirrors, 418 denotes an incident lens, 419 denotes a relay lens, 420 denotes an emission lens, 422, 423 and 424 denote liquid crystal optical modulation deices, 425 denotes a cross dichroic prism, and 426 denotes a projection lens.

The light source 410 includes a lamp 411 such as metal halide and a reflector 412 for reflecting light of the lamp. The dichroic mirror 413 for reflecting blue light and green light transmits red light and reflects blue light and green light among light beams from the light source 410. The transmitted red light is reflected from the reflection mirror 417 and is incident into the liquid crystal optical modulation device 422 for red light, including the liquid crystal device which is an example of the invention.

Among the color lights reflected from the dichroic mirror 413, the green light is reflected from the dichroic mirror 414 for reflecting the green light and is incident into the liquid crystal optical modulation device 423 for green light, including the liquid crystal device which is an example of the invention. In order to compensate the length of the optical path of the blue light different from those of the green light and the red light, a light guide device 421 including a lens system having the incident lens 418, the relay lens 419 and the emission lens 420 is provided. Through the light guide device 421, the blue light is incident into the liquid crystal optical modulation device 424 for blue light, including the liquid crystal device which is an example of the invention.

Three color lights modulated by the optical modulation devices are incident into the cross dichroic prism 425. The prism is formed by attaching four rectangular prisms, in which a dielectric multi-layer film for reflecting the red light and a dielectric multi-layer film for reflecting the blue light are formed in a cross shape. The three color lights are synthesized by the dielectric multi-layer films to form light displaying a color image. The synthesized light is projected onto a screen 427 by the projection lens 426, which is a projection optical system, such that the image is enlarged and displayed.

According to the present embodiment, since the liquid crystal devices 1 to 301 which can easily bend-align all the liquid crystal molecules when a voltage for an initial transition operation is applied are mounted, it is possible to obtain a projector 401 for displaying an image with a high display characteristic and a high response speed.

Sixth Embodiment

Next, a sixth embodiment of the invention will be described. Similar to the first embodiment, in each view used for following description, the scale of each layer or each element is differentiated from each other in order that each layer or each element has a size capable of being identified in the view. The description of the same components as the first embodiment will be omitted. In the present embodiment, the configuration of the protrusion is different from that of the first embodiment and thus will be described in detail.

Figure 16:
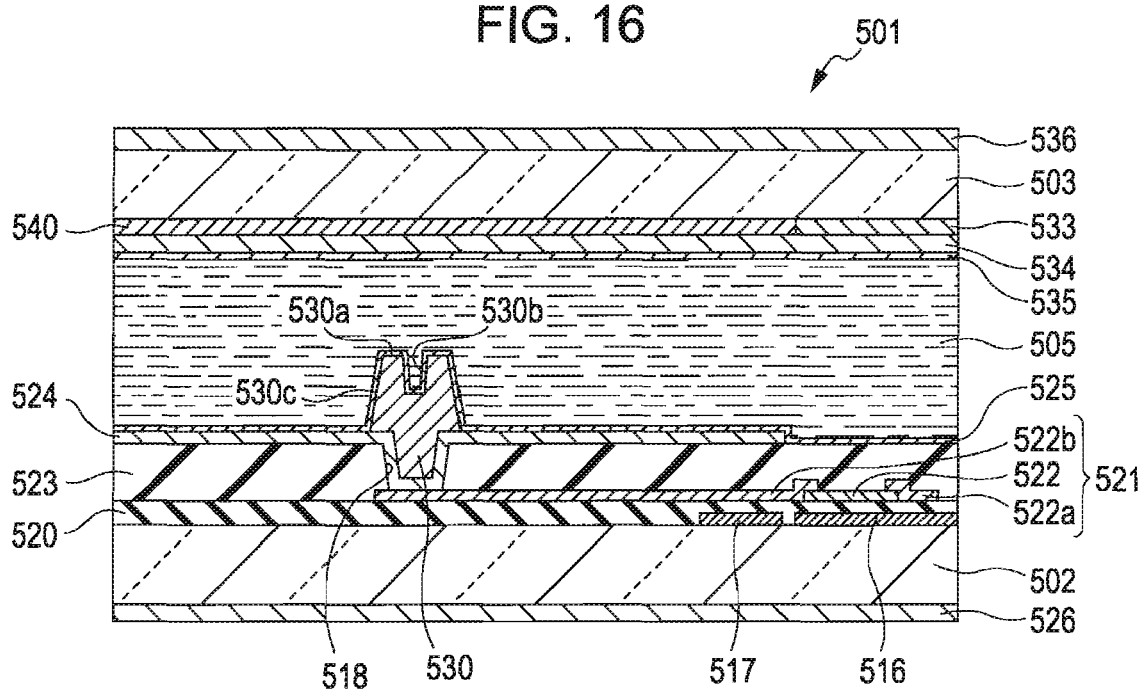
FIG. 16 is a cross-sectional view showing the configuration of a liquid crystal device according to a sixth embodiment of the invention.

FIG. 16 is a cross-sectional view showing the configuration of a liquid crystal device 501 according to the present embodiment, which corresponds to the first embodiment shown in FIG. 10.

As shown in FIG. 16, the liquid crystal device 501 according to the present embodiment is used in a display unit such as a display and is different from the first embodiment in that a color filter layer 540 is provided at the side of the counter substrate 503. The other configuration, for example, the configuration of the protrusion 530, is similar to that of the first embodiment. The invention is also applicable to the liquid crystal device 501 for display, in which the color filter layer 540 is provided. The configurations of the protrusions according to the second to fourth embodiments may be applied to the present embodiment.

Seventh Embodiment

Next, a seventh embodiment of the invention will be described. In the present embodiment, for example, a mobile telephone will be described.

Figure 17:
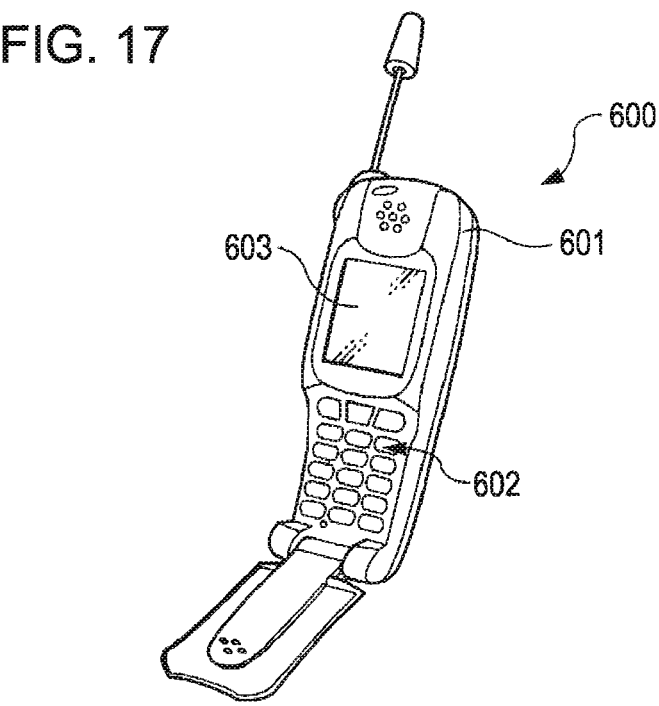
FIG. 17 is a perspective view showing the configuration of a mobile telephone according to a seventh embodiment of the invention.

FIG. 17 is a perspective view showing the entire configuration of the mobile telephone 600.

The mobile telephone 600 includes a casing 601, a manipulation unit 602 having a plurality of manipulation buttons, and a display unit 603 for displaying an image, a moving image or a character. The liquid crystal device 501 according to the sixth embodiment is mounted in the display-unit 603.

In the present embodiment, since the liquid crystal device 501 which can easily bend-align all the liquid crystal molecules when a voltage for an initial transition operation is applied is mounted, it is possible to obtain an electronic apparatus having the display unit for displaying an image with a high display characteristic and a high response speed.

Further, the liquid crystal device according to the embodiments are not limited to the mobile telephone and is applicable as an image display device of an electronic book, a personal computer, a digital still camera, a liquid crystal television set, a view finder type or monitor-direct-view type video tape recorder, a car navigation device, a pager, an electronic organizer, an electronic calculator, a word processor, a workstation, a video telephone, a POS terminal, a device comprising a touch panel or the like. Even in any electronic apparatus, display with high brightness and high contrast is possible.

The invention is not limited to the above-described embodiment, and it is to be understood that changes and modifications may be made without departing from the spirit or scope of the invention as defined by the appended claims.

For example, although the protrusion is formed of the conductive material in the above-described embodiments, the invention is not, limited to this. For example, a non-conductive material such as dielectric may be used.

Although the protrusion is provided at a position which overlaps the contact hole in plan view in the above-described embodiments, the invention is not limited to this. As denoted by a dashed-dotted line of FIG. 2, the protrusion may be provided in the other region of the sub pixel or the inter-pixel region.

The entire disclosure of Japanese Patent Application No. 2006-259472, filed Sep. 25, 2006 is expressly incorporated by reference herein.

What is claimed is:

1. A liquid crystal device which changes an alignment state of liquid crystal molecules of the liquid crystal layer from a spray alignment to a bend alignment to perform display or optical modulation comprising:
   a first substrate and a second substrate which face each other;
   a liquid crystal layer interposed between the first substrate and the second substrate;
   a protrusion provided between the liquid crystal layer and one of the first substrate, the protrusion having a concave portion at its tip; and
   an alignment film covering the surface of the protrusion including the concave portion,
   the concave portion has a predetermined diameter r and a predetermined depth d, and
   the predetermined diameter r and the predetermined depth d satisfy $1 < (d/r) \leqq 5$.

2. The liquid crystal device according to claim 1, further comprising:
   a pixel electrode provided on the first substrate; and
   a switching element which is provided on the first substrate and is electrically connected to the pixel electrode through a contact hole,
   wherein the contact hole is provided in a region which overlaps the pixel electrode in plan view, and
   wherein the protrusion is provided at a position which overlaps the contact hole in plan view.

3. The liquid crystal device according to claim 2, wherein:
   a common electrode is provided on the second substrate at the side of the liquid crystal layer, and
   the protrusion is formed of a conductive material.

4. The liquid crystal device according to claim 2, wherein the protrusion is provided on the pixel electrode.

5. The liquid crystal device according to claim 3, wherein the pixel electrode is provided on the protrusion.

6. The liquid crystal device according to claim 1, wherein the protrusion has a tapered portion at the circumference of the concave portion.

7. A method of manufacturing a liquid crystal device which includes a pair of substrates which face each other and a liquid crystal layer interposed between the pair of substrates, and changes an alignment state of liquid crystal molecules of the liquid crystal layer from a spray alignment to a bend alignment to perform display or optical modulation, the method comprising:

forming a switching element on one of the pair of substrates;

forming an insulating layer on the one substrates so as to cover the switching element;

forming a contact hole electrically connected to the switching element in a portion of the insulating layer;

forming an electrode on the insulating layer so as to cover the inside of the contact hole;

forming a mask layer on the electrode so as to surround the contact hole;

forming a material film on the one substrate, on which the mask layer is formed, by a sputtering method;

forming a protrusion having a concave portion by removing, by a lift-off method, the mask layer and a portion of the material film formed on the mask layer; and forming an alignment film to cover the surface of the protrusion including the concave portion, the concave portion has a predetermined diameter r and a predetermined depth d, and the predetermined diameter r and the predetermined depth d satisfy $1<(d/r)\leqq 5$.

8. A method of manufacturing a liquid crystal device which includes a pair of substrates which face each other and a liquid crystal layer interposed between the pair of substrates, and changes an alignment state of liquid crystal molecules of the liquid crystal layer from a spray alignment to a bend alignment to perform display or optical modulation, the method comprising:

forming a switching element on one of the pair of substrates;

forming an insulating layer on the substrates so as to cover the switching element;

forming a contact hole electrically connected to the switching element in a portion of the insulating layer;

forming a mask layer on the insulating layer so as to surround the contact hole;

forming a conductive material film on the one substrate, on which the mask layer is formed, by a sputtering method;

forming a protrusion having a concave portion by removing, by a lift-off method, the mask layer and a portion of the conductive material film formed on the mask layer and;

forming an electrode on the insulating layer so as to cover the surface of the protrusion including the concave portion; and forming an alignment film on the surface of the one substrate along the surface of the electrode, the concave portion has a predetermined diameter r and a predetermined depth d, and the predetermined diameter r and the predetermined depth d satisfy $1<(d/r)\leqq 5$.

* * * * *